US009694552B2

(12) United States Patent
Tsubotani et al.

(10) Patent No.: US 9,694,552 B2
(45) Date of Patent: Jul. 4, 2017

(54) METHOD FOR MOLDING ANNULAR MEMBER AND APPARATUS FOR MOLDING ANNULAR MEMBER

(75) Inventors: Sousuke Tsubotani, Osaka (JP); Ryoshi Miyamoto, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 441 days.

(21) Appl. No.: 14/350,399

(22) PCT Filed: Oct. 31, 2011

(86) PCT No.: PCT/JP2011/075083
§ 371 (c)(1),
(2), (4) Date: Apr. 8, 2014

(87) PCT Pub. No.: WO2013/065102
PCT Pub. Date: May 10, 2013

(65) Prior Publication Data
US 2014/0252673 A1    Sep. 11, 2014

(51) Int. Cl.
*B29D 99/00* (2010.01)
*B29D 30/48* (2006.01)
*B29C 47/00* (2006.01)
*B29C 47/02* (2006.01)
*B29C 47/08* (2006.01)

(52) U.S. Cl.
CPC ......... *B29D 99/0082* (2013.01); *B29D 30/48* (2013.01); *B29C 47/003* (2013.01);
(Continued)

(58) Field of Classification Search
CPC ....... B29C 47/026; B29C 47/02; B29C 47/04; B29C 47/003; B29C 47/0033;
(Continued)

(56) References Cited

U.S. PATENT DOCUMENTS 7,951,316 B2 *   5/2011  Smith ................. B29C 47/0038
                                                            264/148

FOREIGN PATENT DOCUMENTS

JP    06-297603 A    10/1994
JP    2005-335244 A  12/2005
(Continued)

OTHER PUBLICATIONS

Machine translation of JP2010228343.*
(Continued)

*Primary Examiner* — Philip Tucker
*Assistant Examiner* — Jimmy R Smith, Jr.
(74) *Attorney, Agent, or Firm* — Westerman, Hattori, Daniels & Adrian, LLP

(57) ABSTRACT

The object of the present invention is to provide a method and an apparatus for molding an annular member capable of accurately molding an annular member into a predetermined cross-sectional shape even if the annular member has a thick-walled inner peripheral part and a thin-walled outer peripheral part. The method for molding a bead filler (11) including a thick-walled inner peripheral part (11a) and a thin-walled outer peripheral part (11b), the method comprising the steps of extruding, into an annular shape, rubber (R1) by a first extruder (30) onto a molding table (20) through a first die (31) provided with an opening having the same cross-sectional shape as that of the inner peripheral part (11a) while the molding table (20) is rotated, and molding the inner peripheral part (11a); and extruding, into an annular shape, rubber by a second extruder (40) onto the molding table (20) through a second die (41) provided with an opening having the same cross-sectional shape as that of the outer peripheral part (11b) while the molding table (20) is rotated, and molding the outer peripheral part (11b).

4 Claims, 6 Drawing Sheets

(52) U.S. Cl.
CPC ...... *B29C 47/0019* (2013.01); *B29C 47/0035* (2013.01); *B29C 47/026* (2013.01); *B29C 47/0866* (2013.01); *B29D 2030/482* (2013.01); *B29D 2030/487* (2013.01)

(58) Field of Classification Search
CPC .......... B29D 2030/482; B29D 2030/48; B29D 30/48; B29D 99/0082; B29D 30/487
See application file for complete search history.

(56) References Cited

FOREIGN PATENT DOCUMENTS

| | | | |
|---|---|---|---|
| JP | 2010-228343 | A | 10/2010 |
| JP | 2010228343 | A * | 10/2010 |
| JP | 2010-269505 | A | 12/2010 |
| JP | 2010269505 | A * | 12/2010 |
| JP | 2011-046025 | A | 3/2011 |

OTHER PUBLICATIONS

Machine translation of JP2010269505.*
International Search Report, dated Feb. 7, 2012, issued in corresponding application No. PCT/JP2011/075083.
Notification of Transmittal of Translation of the International Preliminary Report on Patentability (form PCT/IB/338) dated May 15, 2014, issued in International Application No. PCT/JP2011/075083, with forms PCT/IB/373 and PCT/ISA/237 (6 pages).

* cited by examiner

METHOD FOR MOLDING ANNULAR MEMBER AND APPARATUS FOR MOLDING ANNULAR MEMBER

TECHNICAL FIELD

The present invention relates to a method and an apparatus for molding an annular member including a thick-walled inner peripheral part and a thin-walled outer peripheral part.

BACKGROUND ART

A bead member which is one of tire constituent members includes an annular bead filler having a triangular cross section and made of hard rubber, and a bead core formed from a rubber-coated convergent body such as a steel wire. The bead member is produced in such a manner that a bead filler is extruded by an extruder into a band shape through a die, the bead filler is supplied to a bead core which is previously formed into an annular shape, and the bead filler is pasted on an outer peripheral part of the bead core (see Patent Document 1). After the bead filler is cut into a predetermined length, ends thereof are pasted on each other and formed into an annular shape.

However, according to the method of pasting the cut ends to each other to form them into the annular shape, an entire length of the bead filler is varied due to shrinkage or the like of the bead filler and it becomes difficult to adjust the bonding position in some cases. Hence, the following Patent Document 2 describes a method in which a die configuring member of an extruder and a forming surface of a die auxiliary device are abutted against each other in a direction intersecting with each other at right angles or crossing each other, a rubber elastic material is extruded from the extruder toward an outer peripheral surface of a bead grommet (bead core) provided on the forming surface of the die auxiliary device while the die auxiliary device is rotated at a predetermined speed, and the die configuring member and the forming surface of the die auxiliary device form a bead filler having a predetermined cross-sectional shape. That is, according to the forming method of Patent Document 2, the rubber elastic material is inserted into a gap configured between the die configuring member and the forming surface of the die auxiliary device and the rubber elastic material is stretched, thereby forming the bead filler having the predetermined cross-sectional shape.

PRIOR ART DOCUMENTS

Patent Documents

Patent Document 1: JP-A-6-297603

SUMMARY OF THE INVENTION

Problem to be Solved by the Invention

Some bead fillers have such a cross-sectional shape that the bead filler is long in a radial direction thereof, a thickness of its outer peripheral part is especially thinner than that of its inner peripheral part. When such a thinned bead filler which is wide in the radial direction is to be formed, in the forming method of Patent Document 2, to form the thin-walled outer peripheral part, it is necessary that a gap between a die configuring member and a forming surface of the die auxiliary device is especially thinned on the side of the outer peripheral part. However, the rubber elastic material does not easily flow into the narrow gap, and the rubber elastic material adversely flows to the thick-walled inner peripheral part. As a result, it becomes difficult to form the thin-walled outer peripheral part and it becomes difficult to form a bead filler having a predetermined cross-sectional shape.

The present invention has been accomplished in view of the above circumference, and an object of the present invention is to provide a method and an apparatus for molding an annular member capable of accurately molding an annular member into a predetermined cross-sectional shape even if the annular member has a thick-walled inner peripheral part and a thin-walled outer peripheral part.

Means for Solving the Problem

To solve the above problem, a method for molding an annular member in accordance with the present invention is a method for molding an annular member including a thick-walled inner peripheral part and a thin-walled outer peripheral part, the method comprising the steps of extruding, into an annular shape, rubber by a first extruder onto a molding table through a first die provided with an opening having the same cross-sectional shape as that of the inner peripheral part while the molding table is rotated, and molding the inner peripheral part; and extruding, into an annular shape, rubber by a second extruder onto the molding table through a second die provided with an opening having the same cross-sectional shape as that of the outer peripheral part while the molding table is rotated, and molding the outer peripheral part.

A working-effect of the method for molding an annular member according to the above-described configuration will be described. According to this configuration, the thick-walled inner peripheral part can be extruded and molded by the first extruder, and the thin-walled outer peripheral part can be extruded and molded by the second extruder. The first extruder extrudes rubber onto the molding table through the first die provided with the opening having the same cross-sectional shape as the inner peripheral part, and the second extruder extrudes rubber onto the molding table through the second die provided with the opening having the same cross-sectional shape as the outer peripheral part. Therefore, even if thicknesses of the inner peripheral part and the outer peripheral part are largely different from each other, it is possible to accurately mold the inner peripheral part and the outer peripheral part. Further, although the outer peripheral part is thin, since the outer peripheral part is extruded and molded through the second die provided with the opening having the same cross-sectional shape as the outer peripheral part, it is possible to accurately mold the outer peripheral part into a predetermined cross-sectional shape. As a result, according to the method for molding an annular member of the present invention, even if the annular member has a thick-walled inner peripheral part and a thin-walled outer peripheral part, it is possible to accurately mold the annular member into a predetermined cross-sectional shape. In the present invention, any one of a step of molding an inner peripheral part and a step of molding an outer peripheral part may be carried out first, or both the steps may be carried out at the same time. Alternatively, one of the steps may be started halfway through the other step.

In the method for molding an annular member in accordance with the present invention, it is preferable that the annular member is a bead filler, the inner peripheral part is molded on a side closer to an outer periphery of a bead core placed on the molding table, and the outer peripheral part is molded on a side closer to an outer periphery of the molded inner peripheral part.

According to this configuration, the bead core which serves as a benchmark when the inner peripheral part is molded is previously placed on the molding table. Therefore, it is easy to mold the inner peripheral part, and also when the outer peripheral part is molded, since the inner peripheral part which is already molded exists on the molding table, it is easy to mold the outer peripheral part.

In the method for molding an annular member in accordance with the present invention, it is preferable that in the step of molding the inner peripheral part, the first extruder is made to approach a forming surface of the molding table which is under suspension, the extruded rubber is adhered to the forming surface and at the same time, rotation of the molding table is started to start pasting the rubber to the forming surface, after the pasting motion of the rubber on the forming surface is started, an extruding speed of the rubber is gradually accelerated up to a given speed and the first extruder is gradually separated from the forming surface up to a given distance, and the extruding speed of the rubber is gradually decelerated from the given speed immediately before the pasting motion of the rubber on the forming surface is completed.

Rubber is extruded into an annular shape by the first extruder onto the molding table while the molding table is rotated, thereby molding the inner peripheral part. The inner peripheral part is thick and thus, if the inner peripheral part is not accurately cut into a predetermined length, a difference in level is prone to appear at a bonded portion between the ends. According to the above-described configuration, in the step of molding the inner peripheral part, the first extruder is made to approach the forming surface of the molding table which is under suspension, the extruded rubber is adhered to the forming surface and rotation of the molding table is started at the same time. According to this, the pasting motion of rubber on the forming surface is started, and after the pasting motion of rubber on the forming surface is started, the extruding speed of rubber is gradually accelerated up to the given speed, and the first extruder is gradually separated from the forming surface up to a given distance. According to this, a thickness of rubber which is pasted on the molding table gradually becomes thick. On the other hand, immediately before the pasting motion of rubber on the forming surface is completed, the extruding speed of rubber is gradually decelerated from the given speed. According to this, a thickness of rubber pasted on the molding table gradually becomes thin. According to this, when the end of rubber at a pasting starting position and the end of rubber at a pasting ending position are bonded to each other, a rubber thickness-gradually increasing portion and a rubber thickness-gradually reducing portion are superposed on each other, thereby eliminating a difference in level at the bonded portion. After the pasting motion of rubber is started, the extruding speed of rubber is gradually accelerated, and the first extruder is gradually separated from the forming surface up to the given distance. According to this, even if the thickness of rubber gradually becomes thick, it is possible to prevent the first extruder and rubber pasted on the forming surface from coming into contact with each other.

To solve the above problem, an apparatus for molding an annular member in accordance with the present invention is an apparatus for molding an annular member including a thick-walled inner peripheral part and a thin-walled outer peripheral part, the apparatus comprising a rotatable molding table; a first extruder for extruding rubber onto the rotating molding table through a first die provided with an opening having the same cross-sectional shape as that of the inner peripheral part and for molding the inner peripheral part; and a second extruder for extruding rubber onto the rotating molding table through a second die provided with an opening having the same cross-sectional shape as that of the outer peripheral part and for molding the outer peripheral part.

The working-effect of the apparatus for molding an annular member according this configuration is as described above. Even if the annular member includes a thick-walled inner peripheral part and a thin-walled outer peripheral part, it is possible to accurately mold the annular member into a predetermined cross-sectional shape.

MODE FOR CARRYING OUT THE INVENTION

<Apparatus for Molding Annular Member>

Figure 1:
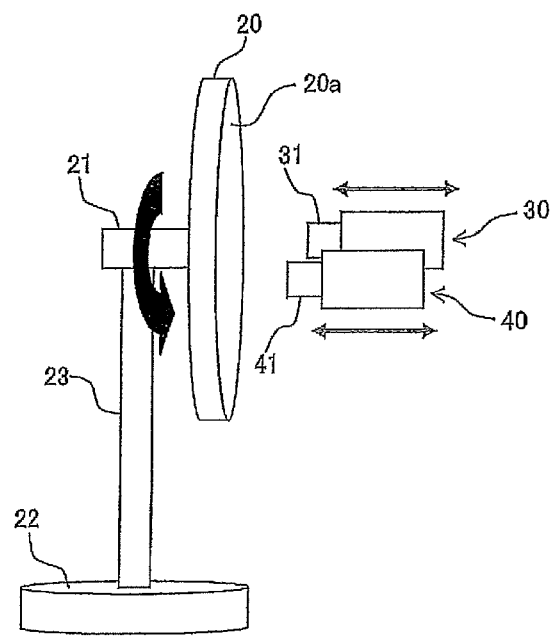
FIG. 1 is a perspective view of an outward appearance showing a schematic configuration of an apparatus for molding an annular member.
Figure 2:
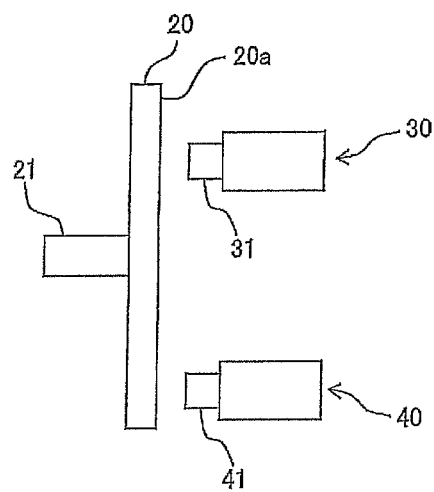
FIG. 2 is a plan view showing the schematic configuration of the apparatus for molding an annular member.
Figure 3:
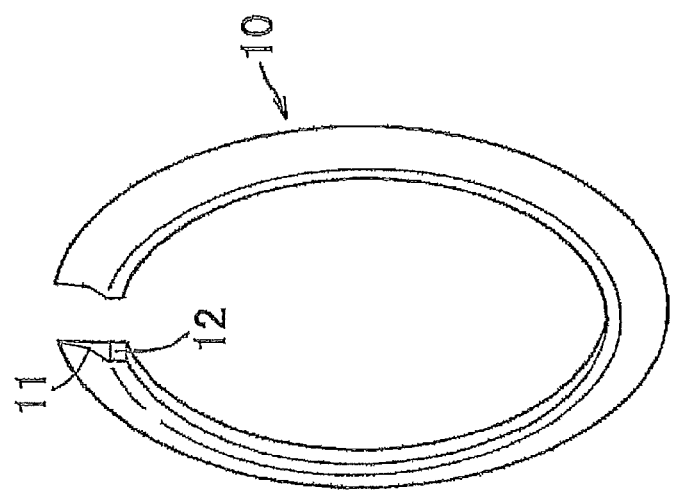
FIG. 3 is a partially cut-away perspective view of a bead member.
Figure 4:
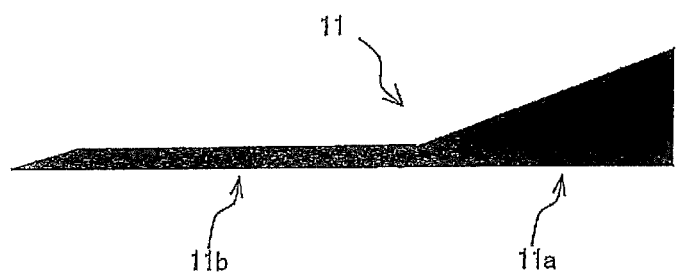
FIG. 4 is a sectional view of a bead filler.

Embodiments of the present invention will be described below with reference to the drawings. FIG. 1 is a perspective view of an outward appearance showing a schematic configuration of a apparatus for molding an annular member according to the present invention. FIG. 2 is a plan view, from the above, of the apparatus for molding an annular member shown in FIG. 1. FIG. 3 is a partially cut-away perspective view of a bead member. FIG. 4 is a sectional view of a bead filler.

In this embodiment, the annular member is a bead filler 11. As shown in FIG. 3, the bead filler 11 is placed on an outer periphery of a bead core 12, and the bead filler 11 and the bead core 12 configure a bead member 10.

Figure 5:
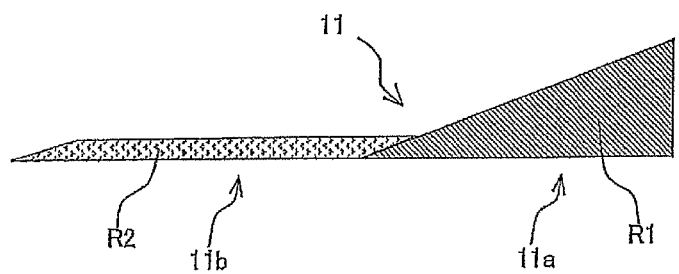
FIG. 5 is a sectional view of the bead filler which is divided into an inner peripheral part and an outer peripheral part.

A cross-sectional shape of an inner peripheral part 11*a* of the bead filler 11 is substantially triangular, and a cross-sectional shape of an outer peripheral part 11*b* of the bead filler 11 is rectangular having a substantially constant thickness. An outer peripheral end is tapered in shape. The present invention is characterized in that the bead filler 11 is divided into the inner peripheral part 11*a* and the outer peripheral part 11*b*, and these peripheral parts 11*a* and 11*b* are independently molded as shown in FIG. 5 for example. Although the inner peripheral part 11*a* is made of rubber R1 and the outer peripheral part 11*b* is made of rubber R2 in the following description, the rubber R1 and the rubber R2 may be the same or different from each other.

The apparatus for molding an annular member includes a rotatable molding table 20, a first extruder 30 and a second extruder 40.

The molding table 20 has a substantially disk shape. The molding table 20 can rotate around a rotation shaft 21 as shown by an arrow in FIG. 1. The rotation shaft 21 is connected to a tip end of a support shaft 23 which extends upward from a support stage 22. The molding table 20 can be driven to rotate by a motor (not shown), and it is possible to freely control the number of rotations of the molding table 20 by controlling the number of rotations of the motor. A rotation direction of the molding table 20 is not limited to the direction shown in the drawing.

In this embodiment, the first extruder 30 and the second extruder 40 are arranged next to each other in the horizontal direction. The first extruder 30 and the second extruder 40 are provided at positions opposed to each other across the rotation shaft 21 of the molding table 20. That is, although the first extruder 30 and the second extruder 40 are provided at positions deviated from each other by 180° around the rotation shaft 21 in this embodiment, these extruders may be provided at positions deviated from each other by 90°, or these extruders may be brought closer to each other only if they do not interfere with each other.

As shown in FIG. 2, the second extruder 40 is provided at a position further from the rotation shaft 21 than the first extruder 30. Hence, the first extruder 30 can extrude and mold the inner peripheral part 11a of the bead filler 11, and the second extruder 40 can extrude and mold the outer peripheral part 11b of the bead filler 11.

The first extruder 30 and the second extruder 40 can move forward and backward with respect to the molding table 20 by extruder driving means (not shown). The extruder driving means is controlled by a control device, and forward and backward moving timing and a driving distance can be controlled.

The first extruder 30 and the second extruder 40 have known configurations and detailed description thereof will be omitted, but each of the extruders mainly includes a hopper into which rubber material is thrown, a screw for sending rubber material forward while heating the rubber material, a cylindrical barrel in which the screw is incorporated, and a drive device for driving the screw. A driving motion and a rotational speed of the screw are controlled by the control device, and an extruding speed of rubber can be controlled.

A first die 31 is provided on a tip end of the first extruder 30. A second die 41 is provided on a tip end of the second extruder 40. The rubbers R1 and R2 are extruded from openings formed in front surfaces of the dies 31 and 41. The opening of the first die 31 has a shape corresponding to a cross-sectional shape of the inner peripheral part 11a of the bead filler 11. The opening of the second die 41 has a shape corresponding to a cross-sectional shape of the outer peripheral part 11b of the bead filler 11. The rubber R1 has a cross-sectional shape which is substantially the same as that of the inner peripheral part 11a, and the rubber R1 is extruded directly from the first extruder 30 and therefore, temperature of the rubber R1 is low, and viscosity of the rubber R1 is high. Hence, even if the annular inner peripheral part 11a is molded from the rubber R1, tension generated from a difference between the inner periphery and the outer periphery is small. The same shall apply to the outer peripheral part 11b molded from the rubber R2.

<Method for Molding Bead Filler>

Figure 6:
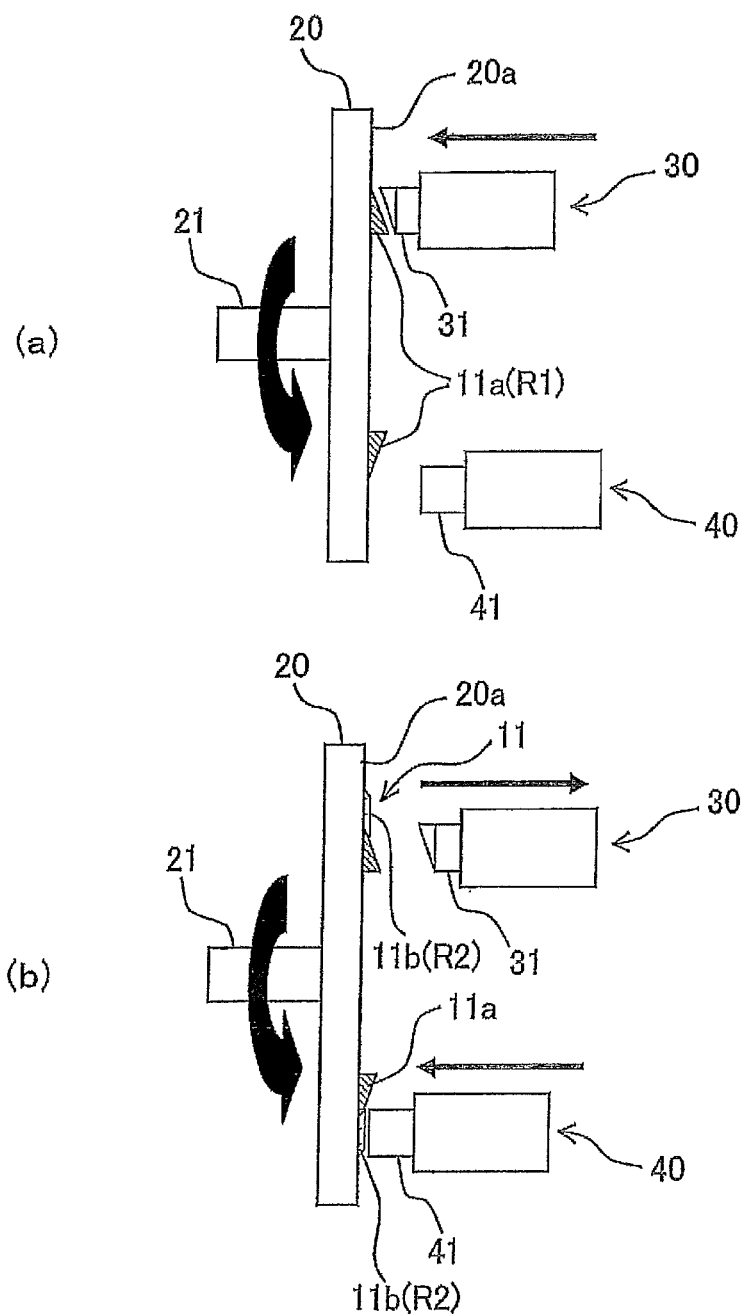
FIGS. 6(*a*) and 6(*b*) are explanatory diagrams for explaining molding steps of the bead filler.

A method for molding the bead filler 11 will be described. FIGS. 6(a) and 6(b) schematically shows steps of molding the bead filler 11. First, as shown in FIG. 6(a), the rubber R1 is extruded into an annular shape by the first extruder 30 onto the molding table 20 through the first die 31 while the molding table 20 is rotated, and the inner peripheral part 11a is molded. At this time, although it is not shown in FIGS. 6(a) and 6(b), it is preferable that the annular bead core 12 is previously placed on the molding table 20 and the inner peripheral part 11a is molded on the side of an outer periphery of the bead core 12.

Next, as shown in FIG. 6(b), the rubber R2 is extruded into an annular shape by the second extruder 40 onto the molding table 20 through the second die 41 while the molding table 20 is rotated, and the outer peripheral part 11b is molded. At this time, the outer peripheral part 11b is molded such that an inner peripheral side of the outer peripheral part 11b is slightly superposed on an outer peripheral side of the inner peripheral part 11a (see FIG. 5) so that the outer peripheral part 11b and the inner peripheral part 11a are reliably bonded to each other. According to this method, even if the bead filler 11 includes the thick-walled inner peripheral part 11a and the thin-walled outer peripheral part 11b, it is possible to accurately mold the annular member into a predetermined cross-sectional shape.

The right time to start the molding motion of the outer peripheral part 11b may be after the molding table 20 goes one circuit and the inner peripheral part 11a is completely molded, but in this embodiment, the right time to start the molding motion may be after a tip end of the rubber R1 on the rotating molding table 20 passes through a location in the vicinity of the second extruder 40, i.e., after the inner peripheral part 11a is molded at least more than half circuit.

As shown in FIGS. 6(a) and 6(b), it is preferable that a tip end of the die 31 inclines with respect to a forming surface 20a of the molding table 20 so that the tip end corresponds to the cross-sectional shape of the molded inner peripheral part 11a. According to this, warpage of the tip end (outer peripheral end) of the inner peripheral part 11a can be eliminated.

Figure 7:
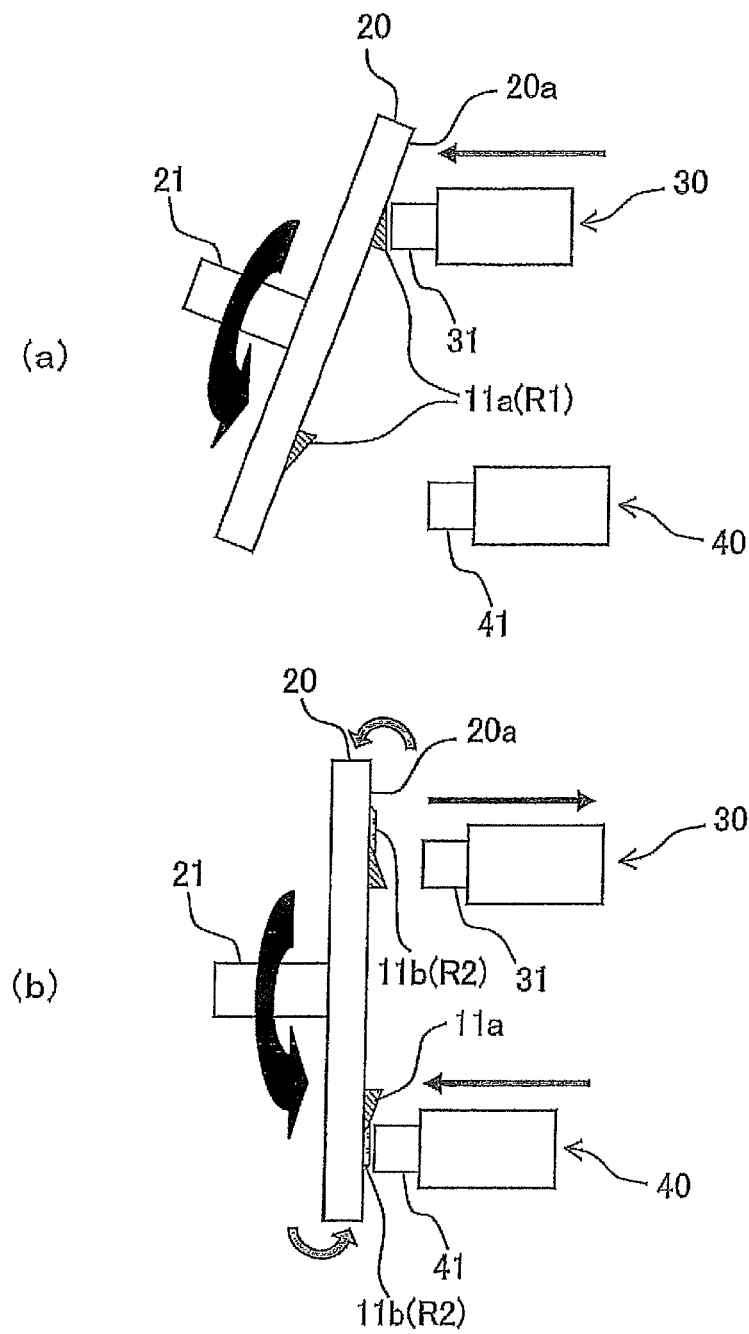
FIGS. 7(*a*) and 7(*b*) are explanatory diagrams for explaining molding steps of a bead filler according to another embodiment.
Figure 8:
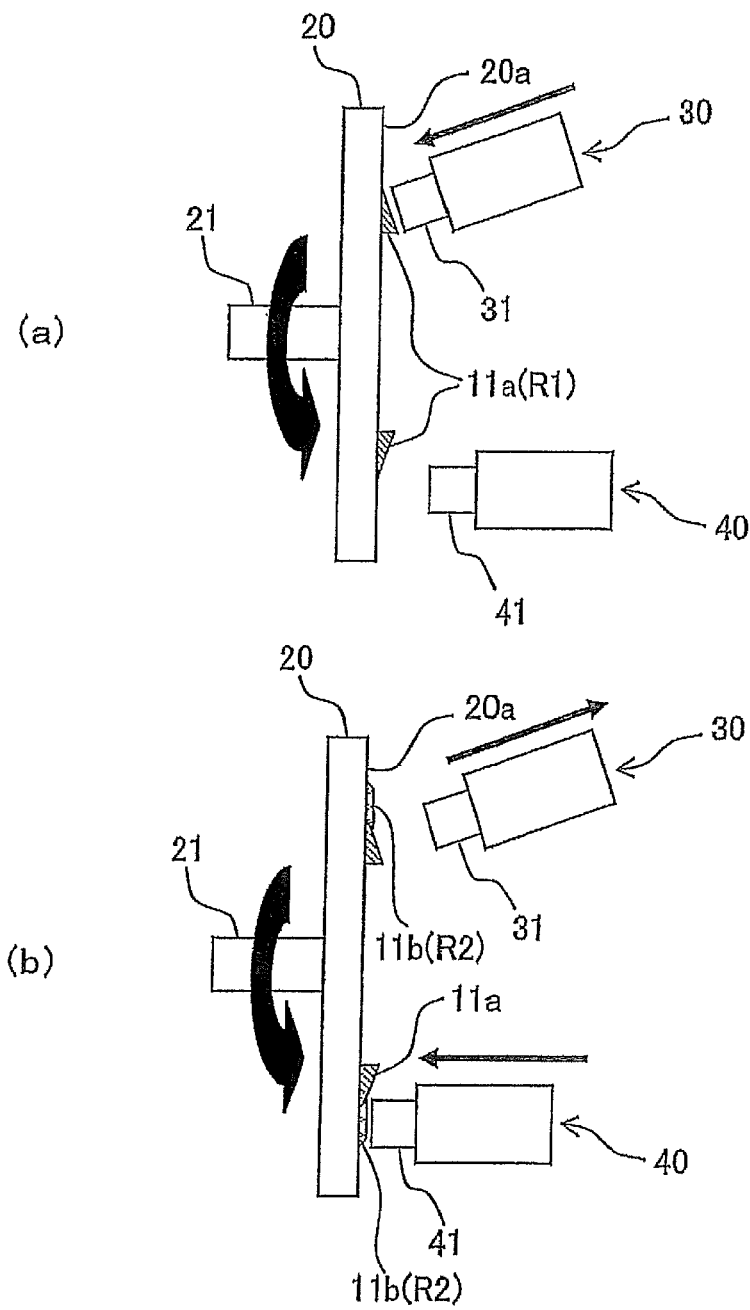
FIGS. 8(*a*) and 8(*b*) are explanatory diagrams for explaining molding steps of a bead filler according to another embodiment.

Alternatively, as shown in FIGS. 7(a) and 7(b), it is possible to employ such a configuration that the molding table 20 inclines by a predetermined angle with respect to the first extruder 30, and the tip end of the die 31 inclines with respect to the forming surface 20a of the molding table 20 so that the tip end corresponds to the cross-sectional shape of the inner peripheral part 11a. Alternatively, as shown in FIGS. 8(a) and 8(b), it is possible to employ such a configuration that the first extruder 30 inclines by a predetermined angle with respect to the molding table 20 so that the tip end of the die 31 inclines with respect to the forming surface 20a of the molding table 20.

Next, a method of pasting the rubber R1 extruded by the first extruder 30 on the forming surface 20a of the molding table 20, and molding the annular inner peripheral part 11a will be described in detail. Since a method of extruding the rubber R2 by the second extruder 40 to mold the annular outer peripheral part 11b is substantially the same as a method of molding the inner peripheral part 11a, description of this method will be omitted. FIGS. 9(a) to 9(f) are explanatory diagrams for explaining details of the molding steps of the inner peripheral part 11a, and show the tip end of the first extruder 30 in an enlarged manner. A lateral direction in FIGS. 9(a) to 9(f) is a rotation direction of the molding table 20.

Figure 9:
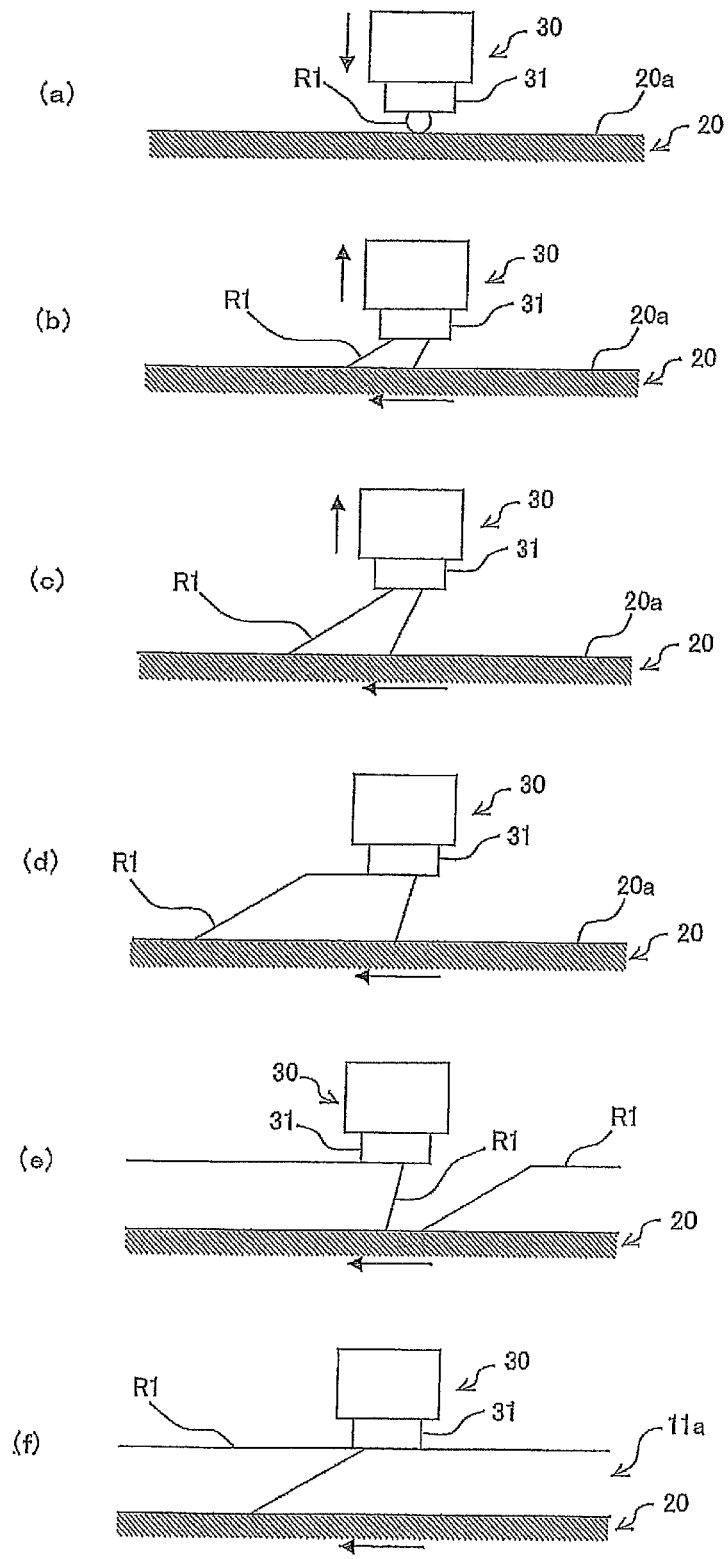
FIGS. 9(*a*) to 9(*f*) are explanatory diagrams for explaining details of molding steps of the inner peripheral part.

As shown in FIG. 9(a), the extruder 30 in its standby state is made to move forward with respect to the molding table 20 and the die 31 is made to approach the forming surface 20a of the molding table 20. At this time, the molding table 20 has not yet rotated.

Next, the extruding motion of the rubber R1 carried out by the extruder 30 is started. According to this, it becomes possible to start pasting the rubber R1 extruded by the extruder 30 on the molding table 20.

As shown in FIG. 9(b), rotation of the molding table 20 is started simultaneously with or substantially simultaneously with an operation of adhering the tip end of the rubber R1 on the forming surface 20a, the extruding speed of the rubber R1 from the die 31 is gradually accelerated. Backward movement of the die 31 is started simultaneously with start of rotation of the molding table 20, and the die 31 is gradually separated from the molding table 20. According to this, a thickness of the rubber R1 which is pasted on the forming surface of the molding table 20 gradually becomes thicker.

The backward movement of the die 31 and acceleration of the extruding speed of the rubber R1 are maintained as shown in FIGS. 9(c) and 9(d) until the thickness of the pasted rubber R1 becomes equal to a desired thickness of the inner peripheral part 11a and after the thickness of the rubber R1 reaches the desired thickness, the backward movement of the die 31 is stopped, and the extruding speed is brought into a constant speed. According to the above-described operation, a cross section of the rubber R1 at the pasting-starting position becomes equal to an inclined surface as shown in the drawing and thereafter, the thickness of the rubber R1 becomes constant.

Rubber R1 is pasted with the constant thickness and in this state, if the die 31 approaches the pasting-starting position as shown in FIG. 9(e), the extruding speed is gradually decelerated. According to this, as shown in FIG. 9(f), the rubber R1 at the pasting-ending position also becomes an inclined surface so as to correspond to the inclined surface at the pasting-starting position, and it is possible to mold the inner peripheral part 11a having no difference in level at the bonded portion.

<Other Embodiments>

The method and the apparatus for molding an annular member may also be used for a molding operation of an annular member other than the above-described bead filler.

DESCRIPTION OF REFERENCE SIGNS 10 bead member
11 bead filler
11a inner peripheral part
11b outer peripheral part
12 bead core
20 molding table
30 first extruder
31 first die
40 second extruder
41 second die
R1 rubber
R2 rubber

The invention claimed is:

1. A method for molding an annular member including a thick-walled inner peripheral part having a triangular cross-sectional shape and a thin-walled outer peripheral part having a rectangular cross-sectional shape, the method comprising the steps of:

extruding, into an annular shape, rubber by a first extruder onto a molding table through an opening portion of a first die, the opening portion of the first die having a shape that is the same as that of the cross-sectional shape of the inner peripheral part, while the molding table is rotated, and molding the inner peripheral part; and extruding, into an annular shape, rubber by a second extruder onto the molding table through an opening portion of a second die, the opening portion of the second die having a shape that is the same as that of the cross-sectional shape of the outer peripheral part, while the molding table is rotated, and molding the outer peripheral part.

2. The method for molding an annular member according to claim 1, wherein the annular member is a bead filler, the inner peripheral part is molded on a side closer to an outer periphery of a bead core placed on the molding table, and the outer peripheral part is molded on a side closer to an outer periphery of the molded inner peripheral part.

3. The method for molding an annular member according to claim 1, wherein in the step of molding the inner peripheral part, the first extruder is made to approach a forming surface of the molding table which is under suspension, the extruded rubber is adhered to the forming surface and at the same time, rotation of the molding table is started to start pasting the rubber to the forming surface, after the pasting motion of the rubber on the forming surface is started, an extruding speed of the rubber is gradually accelerated up to a given speed and the first extruder is gradually separated from the forming surface up to a given distance, and the extruding speed of the rubber is gradually decelerated from the given speed immediately before the pasting motion of the rubber on the forming surface is completed.

4. An apparatus for molding an annular member including a thick-walled inner peripheral part having a triangular cross-sectional shape and a thin-walled outer peripheral part having a rectangular cross-sectional shape, the apparatus comprising:

a rotatable molding table;

a first extruder for extruding rubber onto the rotating molding table through an opening portion of a first die, the opening portion of the first die having a shape that is the same as that of the cross-sectional shape the inner peripheral part, and for molding the inner peripheral part; and a second extruder for extruding rubber onto the rotating molding table through an opening portion of a second die, the opening portion of the second die having a shape that is the same as that of the cross-sectional shape of the outer peripheral part, and for molding the outer peripheral part.

* * * * *